US010476282B2

(12) United States Patent
Maggert et al.

(10) Patent No.: US 10,476,282 B2
(45) Date of Patent: Nov. 12, 2019

(54) MULTIUNIT CHARGER

(71) Applicant: MOTOROLA SOLUTIONS, INC., Schaumburg, IL (US)

(72) Inventors: Kevin K. Maggert, Lawrenceville, GA (US); John E. Herrmann, Suwanee, GA (US); Myra A. Kincaid, Auburn, GA (US); Mark C. Taraboulos, Dunwoody, GA (US); Chi T. Tran, Weston, FL (US); Curtis L. Whetten, Suwanee, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 173 days.

(21) Appl. No.: 14/957,277

(22) Filed: Dec. 2, 2015

(65) Prior Publication Data
US 2017/0163057 A1 Jun. 8, 2017

(51) Int. Cl.
*H02J 7/00* (2006.01)
*H02J 7/02* (2016.01)

(52) U.S. Cl.
CPC ............ *H02J 7/0027* (2013.01); *H02J 7/007* (2013.01); *H02J 7/0044* (2013.01); *H02J 7/0052* (2013.01); *H02J 7/02* (2013.01); *H02J 2007/0062* (2013.01)

(58) Field of Classification Search
USPC .................................................. 320/106–115
See application file for complete search history.

(56) References Cited

U.S. PATENT DOCUMENTS

| 6,794,845 | B2 | 9/2004 | Richards et al. |
| 8,482,251 | B2 | 7/2013 | McGary et al. |
| 8,675,356 | B2 | 3/2014 | Strauser |
| 2011/0181238 | A1* | 7/2011 | Soar .................... B60N 2/24 320/108 |
| 2014/0111147 | A1* | 4/2014 | Soar .................... H01F 27/365 320/108 |
| 2016/0099755 | A1* | 4/2016 | Leabman ............ H04B 5/0037 307/104 |

* cited by examiner

*Primary Examiner* — Binh C Tat
(74) *Attorney, Agent, or Firm* — Michael Best & Friedrich LLP

(57) ABSTRACT

A multiunit charger including a base, a plurality of charging pockets coupled to the base, an accessory organization bar coupled to the base, and a charging circuit coupled to the base. Each one of the plurality of charging pockets is for charging a respective battery powered portable communication device. The accessory organization bar provides retention for a battery powered accessory device. The charging circuit charges the respective battery powered portable communication device. Also disclosed is a battery charging system having the multiunit charger and the accessory device. The accessory device may include a clip coupling the accessory device to the accessory organization bar. The charging circuit may include a transmitter antenna, and the accessory device may include a receiver antenna in wireless charging communication with the transmitter antenna.

17 Claims, 10 Drawing Sheets

MULTIUNIT CHARGER

BACKGROUND OF THE INVENTION

Battery powered portable communication devices are increasingly accompanied by a variety of collaborative accessory devices which require individual charging and storage. Exemplary portable communication devices include, but are not limited to, two-way radios and commercial cellular telephones. Exemplary accessory devices include, but are not limited to, wireless remote speaker microphones, Bluetooth® earpieces, covert key fobs, video cameras, music players, sensors, smart glasses, and the like.

Multiunit chargers for battery powered portable communication devices provide charging and storage of battery powered portable communication devices. There is a need for a multiunit charger.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
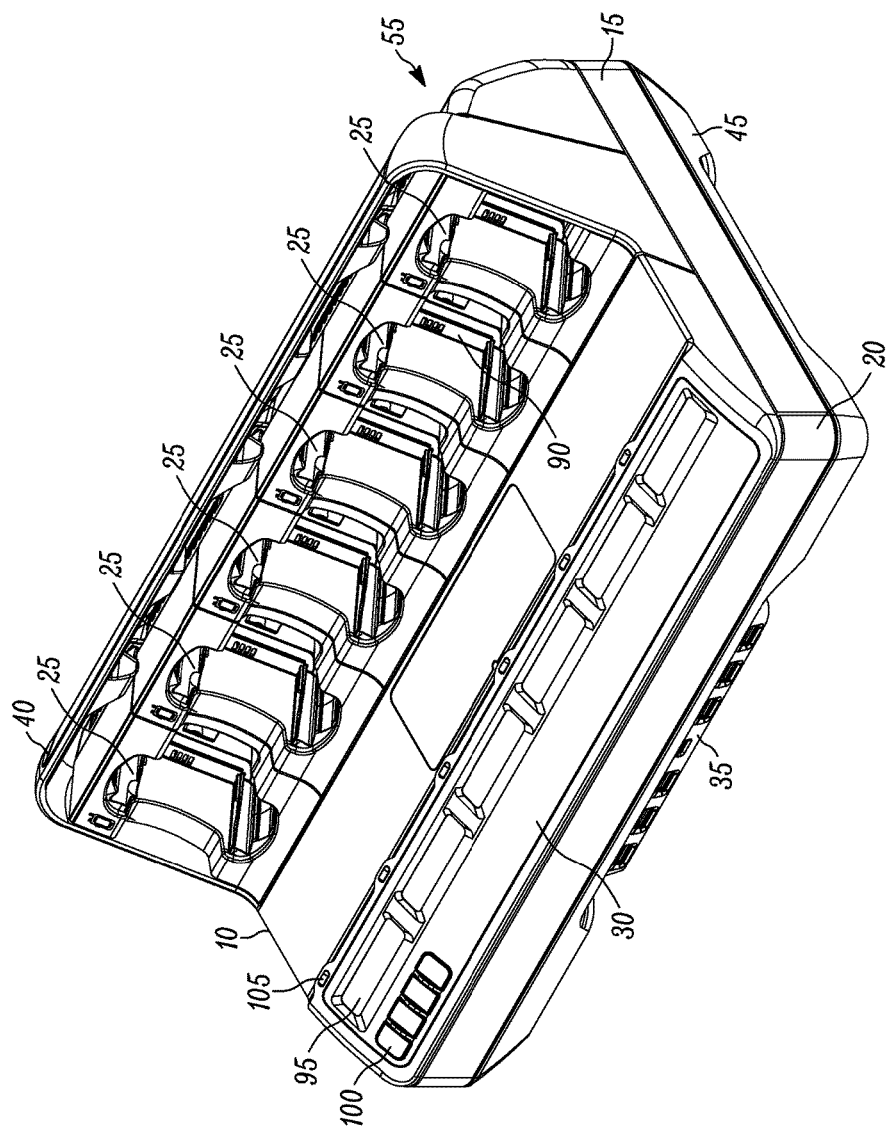
FIG. 1 illustrates a first perspective view of a multiunit charger placed in a first orientation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, illustrating only those specific details that are pertinent to understanding the embodiments of the invention so as not to obscure the disclosure with details that will be readily apparent to those of ordinary skill in the art having the benefit of the description herein.

DETAILED DESCRIPTION OF THE INVENTION

One embodiment provides a multiunit charger. The multiunit charger includes a base, a plurality of charging pockets coupled to the base, an accessory organization bar coupled to the base, and a charging circuit coupled to the base. Each one of the plurality of charging pockets is for charging a respective battery powered portable communication device. The accessory organization bar provides retention for an accessory device. The charging circuit charges the respective battery powered portable communication device.

The charging circuit may include a transmitter antenna coupled to the accessory organization bar. The transmitter antenna wirelessly transmits energy for charging the accessory device. The charging circuit may include the transmitter antenna utilizing magnetic resonance or inductive charging.

In some embodiments, the accessory organization bar of the multiunit charger includes a straight portion having a sectional profile with a width substantially longer than a height. The charging circuit includes a plurality of transmitter antennas for wirelessly charging a plurality of accessory devices. The accessory organization bar includes the plurality of transmitter antennas.

In some embodiments, the multiunit charger further includes charging contacts coupled to the charging circuit and for coupling to the respective battery powered portable communication device, a charging/programming hub having a plurality of interface ports coupled to the charging circuit and the charging/programming hub for coupling to a plurality of charging cables, and/or a cable having a connector coupled thereto for coupling with and charging the accessory device. Each of the plurality of interface ports, charging contacts, and cables may provide data communication.

In some other embodiments, the multiunit charger further includes a housing, and the housing and the accessory organization bar form a pocket for receiving the accessory device. The accessory organization bar may further include a flexible straight portion between a plurality of arcuate portions, and a brace coupled to the flexible straight portion. The accessory organization bar may act as a handle with a housing of the multiunit charger. The accessory organization bar may also provide a space for dissipation of heat from the accessory device when being charged.

Another embodiment provides a battery charging system including the multiunit charger and an accessory device. The accessory device has a clip coupling the accessory device to the accessory organization bar. A charging circuit includes a transmitter antenna, and the accessory device includes a receiver antenna in wireless charging communication with the transmitter antenna. The accessory organization bar supports the transmitter antenna and the clip includes the receiver antenna.

FIG. 1 illustrates a multiunit charger 10 in accordance with some embodiments. The multiunit charger 10 includes a structure 15. The structure 15 includes a base 20, a plurality of charger pockets 25, a user interface 30, a charging/programming hub 35, and an accessory organization bar 40. One or more of the plurality of charger pockets 25, the user interface 30, the accessory organization bar 40, and the charging/programming hub 35 are part of a housing 45 that houses or supports electrical circuitry (discussed below with respect to FIG. 11).

Figure 2:
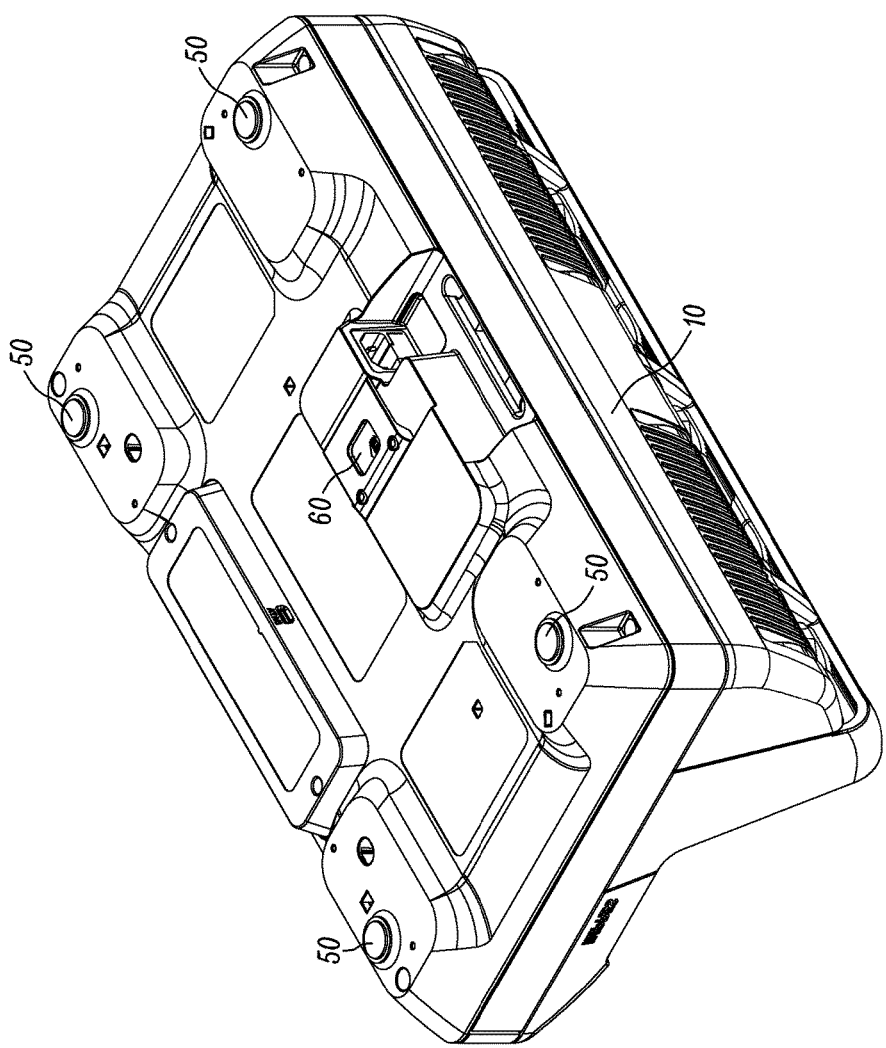
FIG. 2 illustrates a bottom view of the multiunit charger of FIG. 1.
Figure 3:
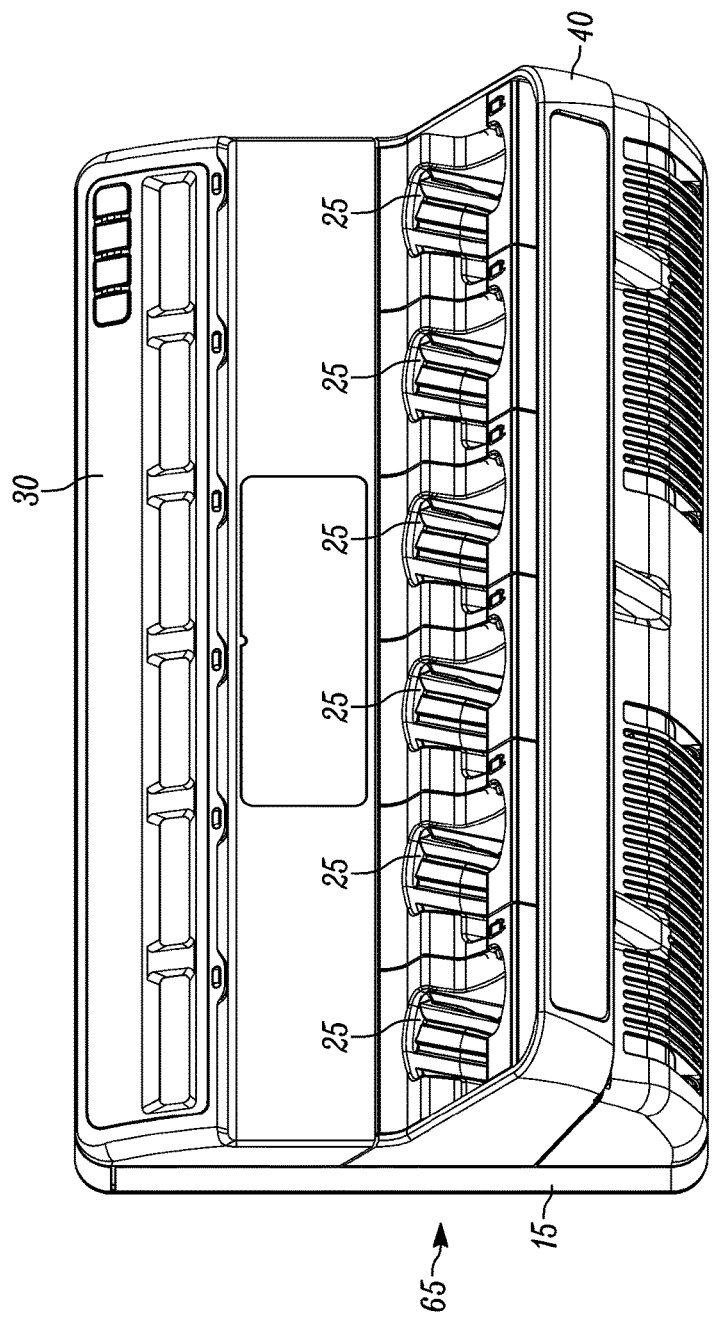
FIG. 3 illustrates a second perspective view of the multiunit charger of FIG. 1 placed in a second orientation.

The base 20 includes supports 50 (FIG. 2) for placing the multiunit charger 10 on a first surface (for example, a table). When placed on the first surface, the multiunit charger 10 is in a first orientation 55 as shown in FIG. 1. The base 20 also includes a wall mount 60 for mounting the multiunit charger 10 to a second surface (for example, a wall) in a second orientation 65 (FIG. 3). The first orientation 55 is shown in FIG. 1 and the second orientation 65 is shown in FIG. 3. The supports 50 also help to position the multiunit charger 10 with respect to the second surface.

Figure 4:
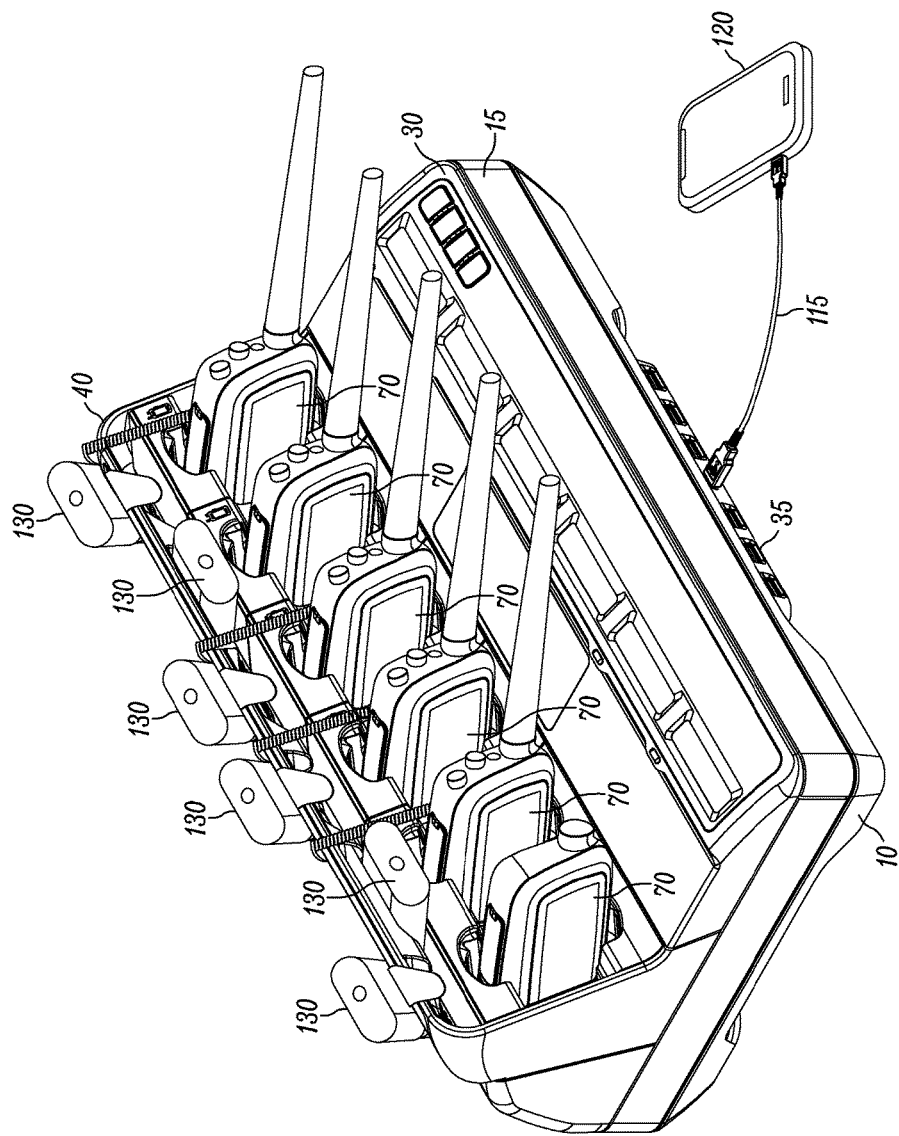
FIG. 4 illustrates the multiunit charger of FIG. 1 with a plurality of battery powered portable communication devices and a plurality of accessory devices.

Referring to FIG. 1, each charger pocket 25 is open-faced for receiving a battery powered portable communication device 70 (shown in FIG. 4). Each charger pocket 25 is shown with four side walls and a bottom wall. The shape of each charger pocket 25 and walls may vary depending on the battery powered portable communication device 70 to be placed in the charger pocket 25. Each charger pocket 25 may include charging contacts 90 (four are shown for exemplary purposes only). The charging contacts 90 provide an electrical connection between a battery powered portable communication device 70 and a charging circuit (discussed below with respect to FIG. 11) housed within the multiunit charger 10. The charging contacts 90 may include, for example, power, charging, ground, and data transfer contacts. The number and type of charging contacts 90 may vary depending on the battery powered portable communication device 70 to be placed in the charger pocket 25. In some embodiments, the charging contacts 90 may be part of a port (for example, a universal serial bus port) depending on the battery powered portable communication device 70 to be placed in the charger pocket 25. It will be appreciated that the shape, the number, and the type of charging contacts 90 of each charger pocket 25 may vary for individual different charger pockets 25 depending on the battery powered portable communication device 70 to be placed in the charger pocket 25. Moreover, in some embodiments, the charger pocket 25 does not include any charging contacts 90. Instead, the charger pocket 25 may include wireless charging circuitry similar to the wireless charging circuitry discussed below.

The multiunit charger 10 includes the user interface 30 for receiving control input from a user for operation of the multiunit charger 10, and/or communicating information from the multiunit charger 10 to the user. The user interface 30 is operably coupled to the electrical circuitry. The illustrated user interface 30 includes a display 95, buttons 100, and light emitting diodes 105. The user interface 30 may include other interface elements, such as a touch-screen display, a plurality of knobs, dials, switches, and the like.

Figure 6:
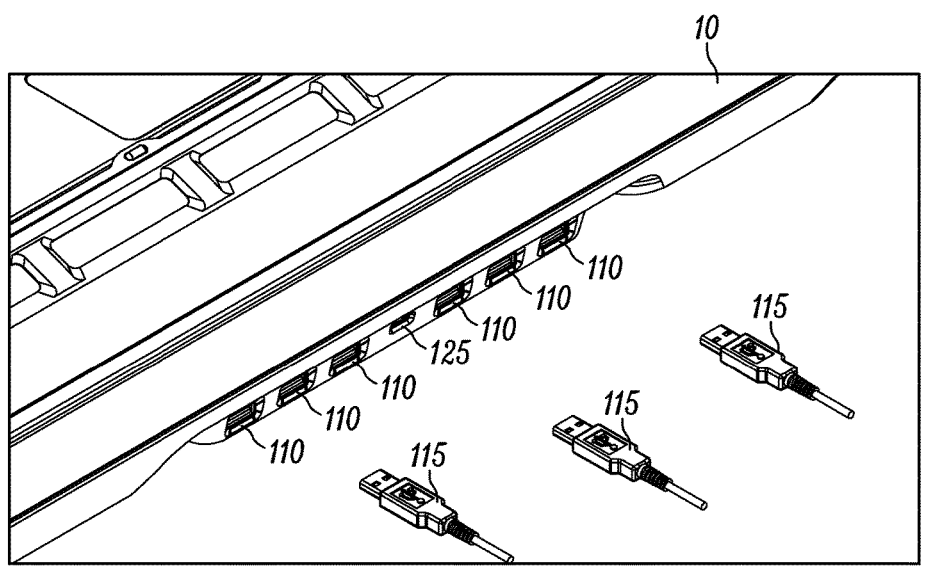
FIG. 6 illustrates a charging/programming hub within the multiunit charger of FIG. 1.

The charging/programming hub 35, further illustrated in FIG. 6, includes a plurality of interface ports 110 for coupling cables 115 to the multiunit charger 10. The interface ports 110 are shown as universal serial bus (USB) ports. However, other port types may be used in alternative to the universal serial bus ports. The charging/programming hub 35 allows accessories or other battery powered electronic devices (for example, FIG. 4 shows a commercial cellular telephone 120) to be coupled to the multiunit charger 10. The devices coupled to the charging/programming hub 35 may be charged by and/or transfer data via the interface ports 110. One or more of the interface ports (for example, interface port 125) may also allow the multiunit charger 10 to couple to another electronic device, such as a host computer, for transferring data between the multiunit charger 10 and the electronic device. For example, data transferred from the battery powered portable communication devices 70 may be transferred to the electronic device via interface port 125 for analysis and/or storage.

Figure 5:
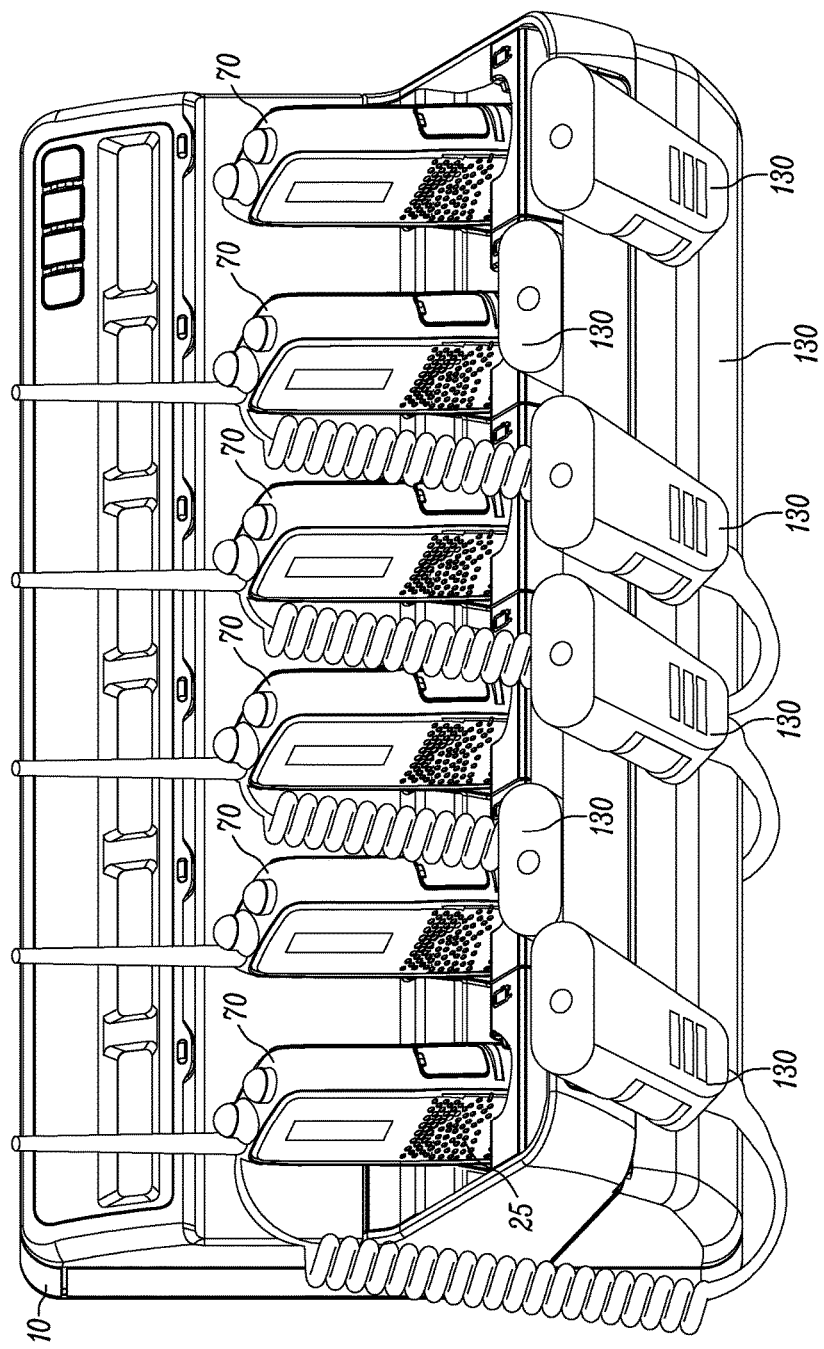
FIG. 5 illustrates an alternative view of the multiunit charger of FIG. 3 with a plurality of battery powered portable communication devices and a plurality of accessory devices.

FIG. 4 shows the multiunit charger 10 of FIG. 1 with a plurality of battery powered portable communication devices 70 inserted in the plurality of charger pockets 25. Each of the battery powered portable communication devices 70 includes communication circuitry and a rechargeable battery located within a housing of the battery powered portable communication device 70. Each of the battery powered portable communication devices 70 includes a second plurality of charging contacts which correspond, align, and mate with the plurality of charging contacts 90. FIG. 5 shows the multiunit charger 10 in the second orientation 65 and with the plurality of battery powered portable communication devices 70 inserted in the plurality of charger pockets 25.

Referring to FIG. 4, the multiunit charger 10 includes the accessory organization bar 40 for retaining and organizing a plurality of accessory devices 130, one or more of which may be separately powered by a battery. While a plurality of accessory devices 130 are retained by the accessory organization bar 40, one or more of the accessory devices 130 may also be charged by the multiunit charger 10. Further, communication may take place between the accessory devices 130 and the multiunit charger 10. The communication may include transfer of data and programming between the accessory devices 130 and the multiunit charger 10. Each accessory device 130 may be associated with a battery powered portable communication device 70. For example, a battery powered portable communication device 70 may be a portable two way radio and the associated accessory device 130 may be a remote speaker microphone. The accessory organization bar 40 allows storage, charging, data transfer, and/or programming of the accessory devices 130 in close proximity to its higher powered companion battery powered portable communication device 70.

FIG. 4 illustrates a plurality of accessory devices 130, wired and wireless, coupled to the accessory organization bar 40. The accessory organization bar 40 may include a fastener for fastening and removing the accessory organization bar 40 from the structure 15. The removal of the accessory organization bar 40 allows for future adaptation of the multiunit charger 10 to other accessory devices. The accessory organization bar 40 allows accessory devices 130 to be located adjacent to their main battery powered portable communication devices 70.

Figure 7:
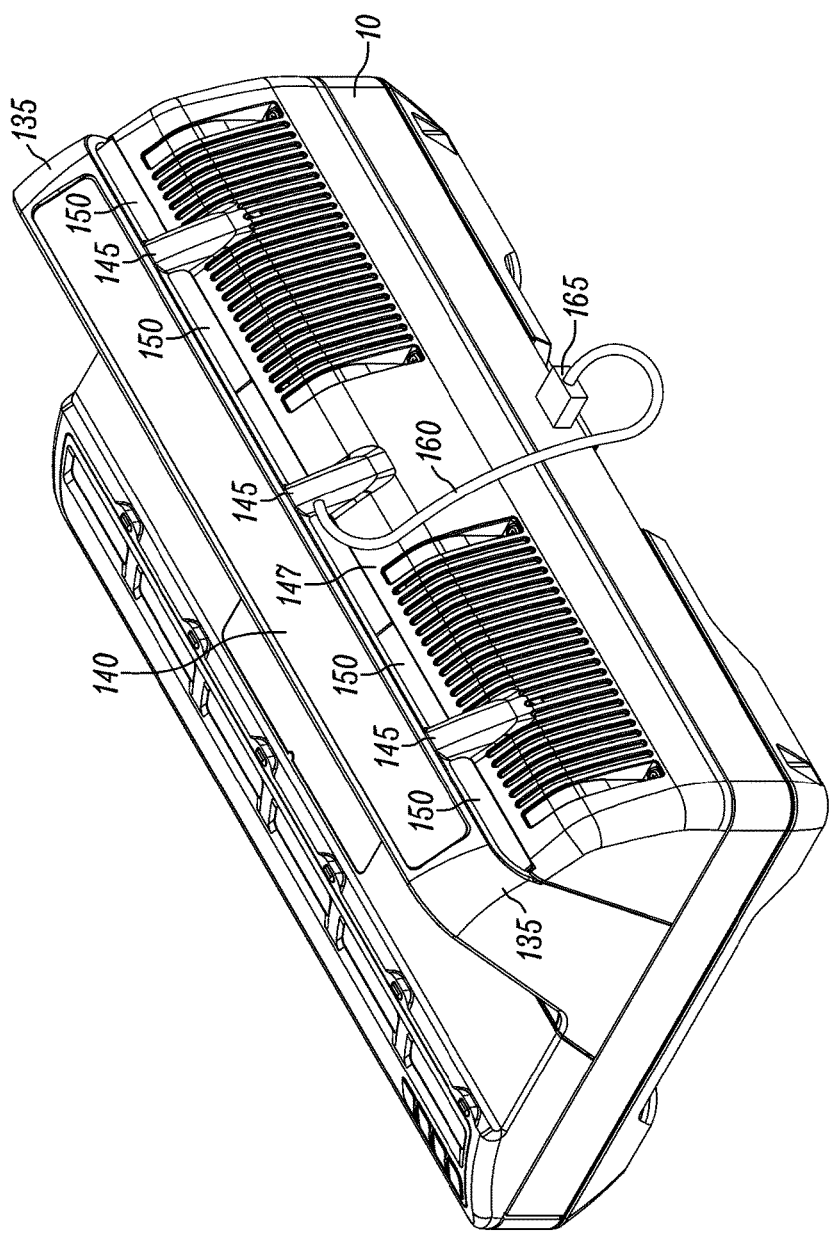
FIG. 7 illustrates a back view of the multiunit charger of FIG. 1.
Figure 8:
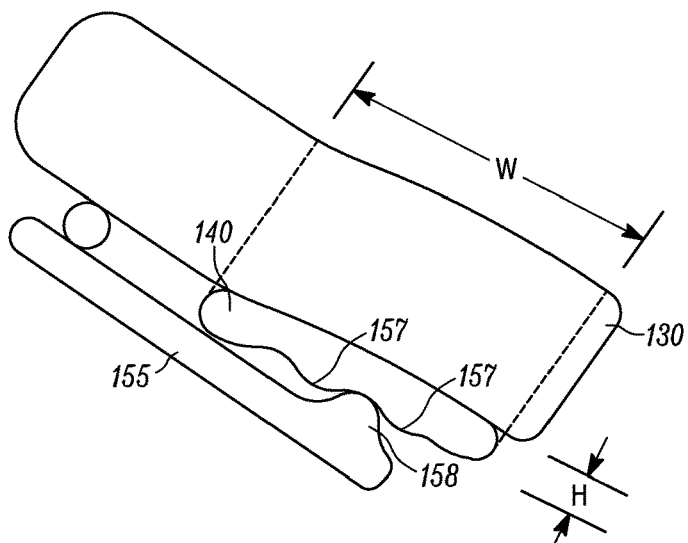
FIG. 8 illustrates a cross section of an accessory device and an accessory organization bar.

Referring to FIG. 7, the accessory organization bar 40 includes curved portions 135, a flexible straight portion 140 between the curved portions 135, and braces 145. The braces 145 support the flexible straight portion 140 and help to define pockets 150. The pockets 150 may secure an accessory device 130 not having a clip (discussed below with respect to FIG. 8). Such an exemplary accessory device 130 may be a two-way radio wireless Bluetooth® push to talk pod. The distance between the flexible straight portion 140 and a hood 147 of the housing 45 is slightly smaller than a width of the accessory device 130 to be wedged. The flexible straight portion 140 slightly flexes allowing the accessory device 130 to wedge between the flexible straight portion 140 and the hood 147. The braces 145 prevent the flexible straight portion 140 from flexing too much.

The flexible straight portion 140 of the accessory organization bar 40 has a cross section profile sufficient for an accessory device 130 to be clipped to the accessory organization bar 40. The profile includes a width W much greater than a height H of the profile. For example, the width W may be at least double the height H. In other examples, the width is greater than three times the height.

Many accessory devices 130 (for example, a remote speaker microphone) utilize a clip 155 for attaching the accessory device 130 to an object (for example, an article of clothing, such as a belt or suspender, worn by a user). Similarly, the clip may allow for attachment to the accessory organization bar 40. The flexible straight portion may include strips 157 for helping to retain a flange 158 of the clip 155. The accessory organization bar 40 being disposed away from the hood further allows for the isolation of heat from the charging devices. Also, the accessory organization bar 40 enables accessory and cable management functionality in both desktop and wall mount configurations.

A cable 160 having a connector 165 may be routed through the structure 15 and exit the structure 15, such as through an opening of the braces 145. The cable 160 may couple to a port of an accessory device 130. The cable 160 allows for charging, data transferring, and/or programming of the accessory device 130. Data transmitted from the accessory device 130 may be transmitted from the accessory device 130 to the external electronic device (for example, the host computer) as discussed earlier.

Figure 9:
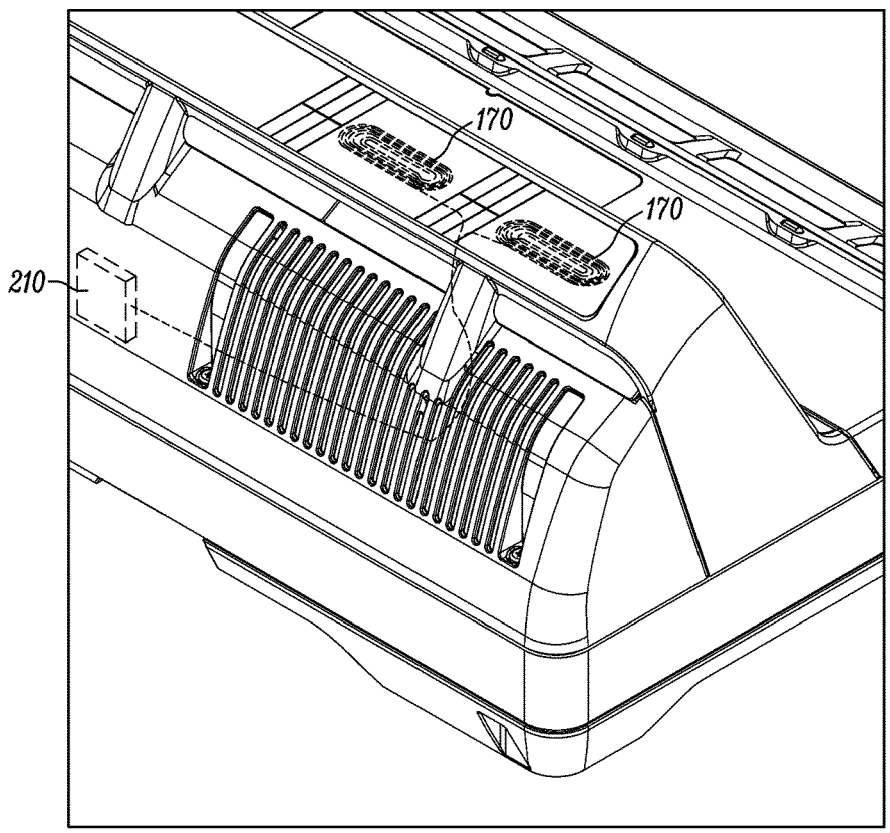
FIG. 9 illustrates a wireless charging circuit in the multiunit charger.
Figure 10:
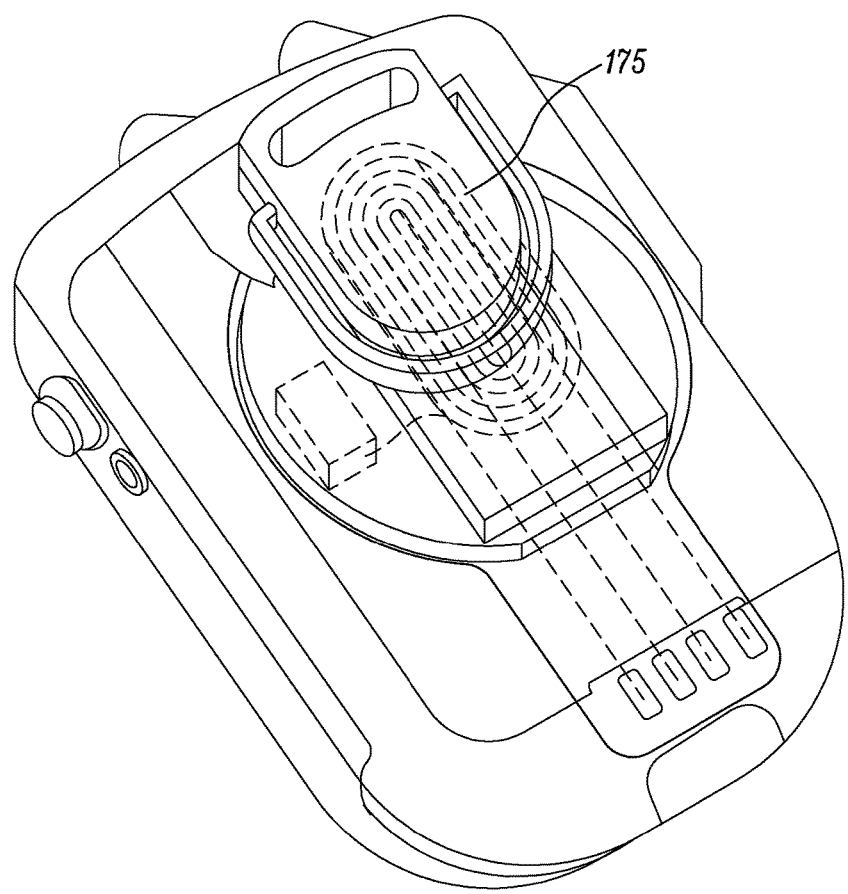
FIG. 10 illustrates a wireless charging circuit in a battery power accessory device.

In some embodiments, the clip 155 may include circuitry and the accessory organization bar 40 may include circuitry for providing wireless charging between the accessory organization bar 40 and the accessory device 130. More specifically, the accessory organization bar 40 shown in FIG. 9 includes transmitter antennas 170 (for example, first coiled antennas) coupled to wireless charging circuitry. The accessory device 130 shown in FIG. 10 may include a receiver antenna 175 (for example, a second coiled antenna) for receiving the wireless power transferred from a transmitter antenna 170. The circuitry for transferring power may include resonance charging circuitry or inductor charging circuitry. The accessory organization bar 40 is powered from the multiunit charger 10 and enables easy adaption and integration of new systems such as wireless charging.

Figure 11:
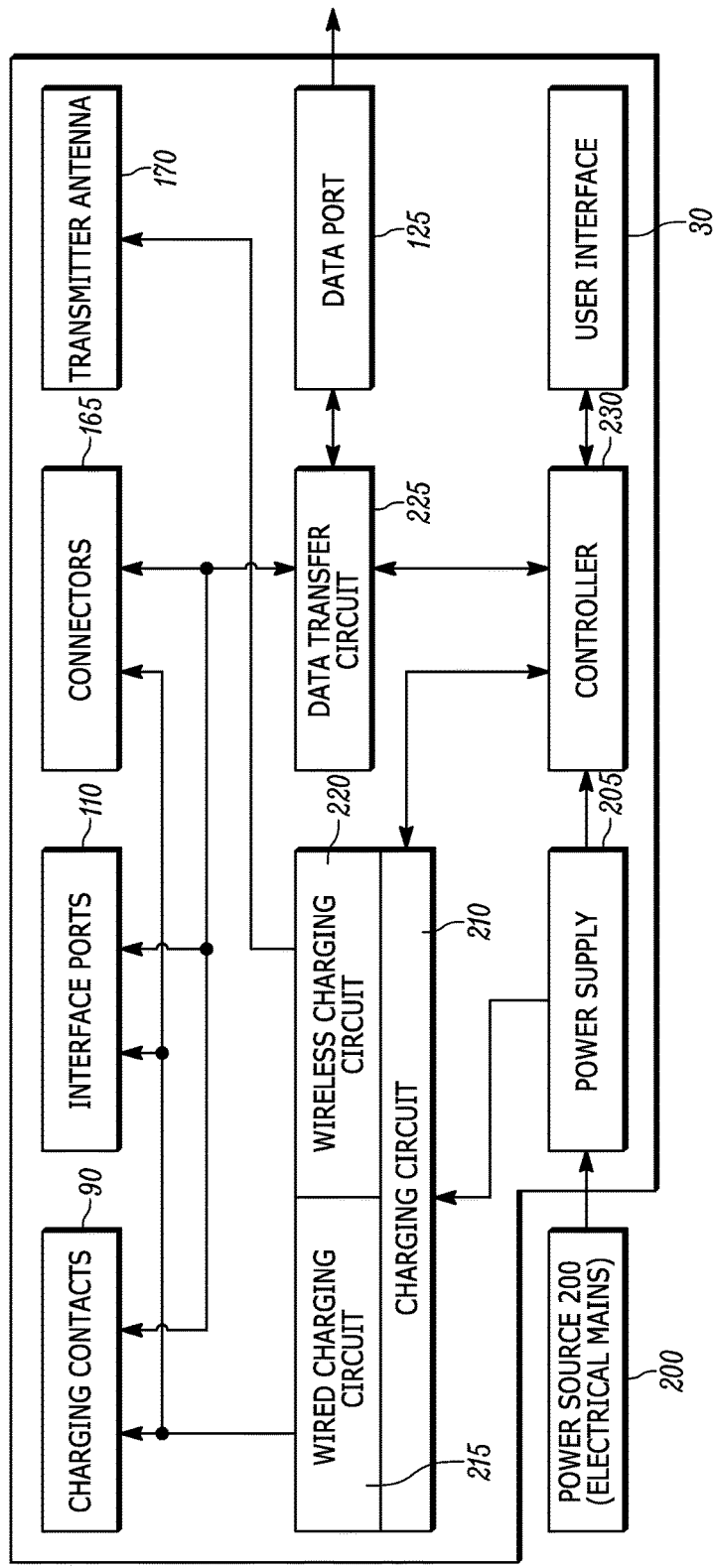
FIG. 11 illustrates a block diagram of the electrical circuitry of a multiunit charger.

FIG. 11 illustrates a block diagram of electrical circuitry of the multiunit charger 10 in accordance with some embodiments. The multiunit charger 10 couples to electrical mains 200. Power from electrical mains is made available to a power supply 205. The power supply 205 makes multiple constant voltages and/or constant currents available to the electrical circuitry of the multiunit charger 10 and the devices coupled to the multiunit charger 10. Exemplary voltages include one or more direct current (DC) voltages for electronics of the multiunit charger 10, one or more direct current voltages for the battery powered portable communication devices 70, one or more direct current voltages for the accessory devices 130 coupled to the multiunit charger 10, one or more voltages and/or currents for charging circuit 210, and the like. The power supply 205 is illustrated in FIG. 11 as a single block. However, the power supply 205 may include multiple power supplies and be distributed throughout and among the blocks shown in FIG. 11.

The multiunit charger 10 includes charging circuit 210. The charging circuit 210 includes circuitry for wired charging 215 via ports and wired connectors, and circuitry for wireless charging 220 via a transmitter antenna. Charging circuit 210 provides multiple constant current and/or constant voltage charges for charging battery powered portable communication devices 70 and accessory devices 130 coupled to the multiunit charger 10. As described above, a battery powered portable communication device 70 may be electrically coupled to the multiunit charger 10 via the charging contacts 90 of a charger pocket 25. An accessory device 130 may be electrically coupled to an interface port 110 of the charging/programming hub 35 and a connector 165 of a cable 160. An accessory device 130 may alternatively be electromagnetically (i.e., wirelessly) coupled to a transmitter antenna 170. While a single block is shown for the charging circuit 210, including the wired charging circuit 215 and the wireless charging circuit 220, the charging circuit 210 may include multiple charging circuits distributed throughout and among the blocks shown in FIG. 11. For example, each charger pocket 25 may include a distinct wired charging circuit 215. As another example, separate charging circuitry may be coupled to the interface ports 110 and the connectors 165.

The multiunit charger 10 may include wireless charging circuit 220. The wireless charging circuit 220 and the transmitter antenna 170 provides wireless charging of accessory devices 130 coupled to the accessory organization bar 40. The wireless electromagnetic charge may be accomplished by magnetic resonance or induction wireless charging as is conventionally known.

The multiunit charger 10 includes data transfer circuit 225. The data transfer may be via any one of the charging contacts 90, interface ports 110, and connectors 165. As an example, the charging contacts 90 may include a dedicated connection for serial data communication. As another example, the interface ports 110 may utilize a well-known port type and protocol, such as a universal serial bus (USB) port, and the data transfer circuit 225 includes circuitry to accomplish communication under that standard. It is also envisioned that the wireless charging circuit 220 and the transmitter antenna 170 may allow for data communication between the multiunit charger 10 and an accessory device 130. As such, the single block for the data transfer circuit 225 shown in FIG. 11 may include multiple circuits distributed throughout and among the blocks shown in FIG. 11.

Controller 230 controls the operation of multiunit charger 10 according to programmed instructions stored within the controller 230. The controller includes a memory for storing the instructions and an electronic processor for executing the instructions. The memory may also include memory for storing data. The data may include data for operating the multi-unit charger or data acquired from devices coupled to the multi-unit charger. The operation of the controller is based on input from the user interface 30.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure 15 that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code and data stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A multiunit charger, comprising:
    a base including a housing and at least one support;
    a plurality of charging pockets integrated within the housing, each one of the plurality of charging pockets for charging a respective battery powered portable communication device;
    an accessory organization bar coupled to the base, the accessory organization bar providing retention for an accessory device;
    a charging circuit housed in the housing and coupled to the base to charge the respective battery powered portable communication device; and
    wherein the charging circuit includes a plurality of transmitter antennas for wirelessly charging a plurality of accessory devices, and wherein the accessory organization bar includes the plurality of transmitter antennas.

2. The multiunit charger of claim 1, wherein the charging circuit includes a transmitter antenna coupled to the accessory organization bar, the transmitter antenna operating to wirelessly transmit energy for charging the accessory device.

3. The multiunit charger of claim 2, wherein the charging circuit including the transmitter antenna utilizes one of a group consisting of magnetic resonance and inductive charging.

4. The multiunit charger of claim 1, wherein the accessory organization bar includes a straight portion having a sectional profile with a width greater than twice a height.

5. The multiunit charger of claim 1, further comprising charging contacts coupled to the charging circuit and for coupling to the respective battery powered portable communication device.

6. The multiunit charger of claim 1, further comprising a charging/programming hub having a plurality of interface ports coupled to the charging circuit and the hub for coupling to a plurality of charging cables.

7. The multiunit charger of claim 6, wherein each of the plurality of interface ports provide data communication.

8. The multiunit charger of claim 1, further comprising a cable having a connector coupled thereto for coupling with and charging the accessory device.

9. The multiunit charger of claim 1, further comprising a plurality of cables coupled to the charging circuit, each cable having a respective connector for coupling to a respective accessory device.

10. The multiunit charger of claim 1, wherein the accessory organization bar further comprises a power/data interconnect for automatically transferring data and charging the accessory device.

11. The multiunit charger of claim 1, wherein the housing includes a hood, and the hood and the accessory organization bar form a pocket for receiving the accessory device.

12. The multiunit charger of claim 1, wherein the accessory organization bar includes a flexible straight portion between a plurality of curved portions, the accessory organization bar further includes a brace coupled to the flexible straight portion.

13. The multiunit charger of claim 1, wherein the accessory organization bar forms a carry handle with the housing.

14. The multiunit charger of claim 13, wherein the accessory organization bar is coupled to and across the housing at a predetermined distance from the plurality of charging pockets to provide a space for dissipation of heat from the accessory device when being charged.

15. A battery charging system, comprising
    the multiunit charger of claim 1, and
    an accessory device having a clip coupling the accessory device to the accessory organization bar.

16. The battery charging system of claim 15, wherein and the accessory device includes a receiver antenna in wireless charging communication with at least one of the plurality of transmitter antenna.

17. The battery charging system of claim 16, wherein the clip includes the receiver antenna.

* * * * *